United States Patent [19]
Graunke et al.

[11] Patent Number: 5,991,399
[45] Date of Patent: Nov. 23, 1999

[54] METHOD FOR SECURELY DISTRIBUTING A CONDITIONAL USE PRIVATE KEY TO A TRUSTED ENTITY ON A REMOTE SYSTEM

[75] Inventors: Gary L. Graunke, Beaverton; John Carbajal, Portland; Richard L. Maliszewski, Forest Grove; Carlos V. Rozas, Hillsboro, all of Oreg.

[73] Assignee: Intel Corporation, Santa Clara, Calif.

[21] Appl. No.: 08/993,597

[22] Filed: Dec. 18, 1997

[51] Int. Cl.$^6$ .............................. H04L 9/00; H04L 9/08; H04L 9/30; H04L 9/32
[52] U.S. Cl. .................. 380/4; 380/5; 380/9; 380/21; 380/23; 380/25; 380/30; 380/49; 380/50
[58] Field of Search .............................. 380/4, 9, 21, 23, 380/25, 30, 44, 45, 46, 47, 49, 50, 52, 59, 3, 5; 705/1; 369/99, 100, 110, 112

[56] References Cited

U.S. PATENT DOCUMENTS

| | | | |
|---|---|---|---|
| 4,634,807 | 1/1987 | Chorley et al. | 380/4 |
| 4,670,857 | 6/1987 | Rackman | 380/4 |
| 5,450,489 | 9/1995 | Ostrover et al. | 380/3 |

*Primary Examiner*—Bernarr E. Gregory
*Attorney, Agent, or Firm*—Steven P. Skabrat

[57] ABSTRACT

Secure distribution of a private key to a user's application program (also called a "trusted player" such as a DVD player or CD-ROM player) with conditional access based on verification of the trusted player's integrity and authenticity is provided. Once validated, the trusted player uses the private key to decrypt encrypted digital content. The private key is dynamically generated, associated with specific digital content, and communicated in real-time from a server to the trusted player in a secure manner, thereby controlling access to encrypted digital content. The key is wrapped into an executable tamper resistant key module in which the key can only be used by the right trusted player as determined by the server based on user requests and payment. The key module plugs in to the trusted player and executes to validate the player and decrypt the content. The integrity of the trusted player is correlated to its ability to perform a cryptographic operation using an asymmetric key pair in a manner that is tamper resistant, thereby preventing an unencrypted copy of digital content to be made.

37 Claims, 6 Drawing Sheets

MANIFEST

VERSION: 2.0
    NAME: PLAYER.EXE
    DIGEST ALGORITHM: MD5
    MD5_DIGEST: <BASE64 DIGEST VALUE>
    SW VERSION : 2.00
    SIGNATURE VERSION : 2.0

NAME: PLAYER.EXE
    DIGEST ALGORITHM: MD5
    MD5 DIGEST: <XXXX>
    SIGNATURE : <PKCS#7SIGBLK>

METHOD FOR SECURELY DISTRIBUTING A CONDITIONAL USE PRIVATE KEY TO A TRUSTED ENTITY ON A REMOTE SYSTEM

BACKGROUND OF THE INVENTION

1. Field of the Invention

The present invention relates generally to digital content protection in computer systems and more specifically to dynamically and securely distributing a private key over a network so only a specific trusted player can use the private key to access specific encrypted digital content.

2. Description of Related Art

The personal computer (PC) platform is an open and accessible computer architecture. However, the openness of the PC means that it is a fundamentally insecure computing platform. Both the hardware and software can be accessed for observation and modification. This openness allows malicious users and programs to observe and to modify executing code. For example, this insecurity has been exploited by software viruses that attack a user's PC. Software viruses infect PCs by masquerading as popular software or by attaching themselves to other programs. Such observation or modification can be performed by either a malevolent user or a malicious program. Yet, there are classes of operations that must be performed securely on the fundamentally insecure PC platform. These are applications where the basic integrity of the operation must be assumed, or at least verified, to be reliable. Examples of such operations include financial transactions and other electronic commerce, unattended access authorization, and digital content management. The recent use of the Internet as a new content delivery mechanism adds yet another dimension to the uses of PCs.

For content providers, the threat of digital piracy at the PC requires new software that is resistant to attacks by a malicious user. In this scenario, the malicious user may wish to tamper with or replace components of the software in order to gain unauthorized access to digital content or to make unauthorized reproductions. A cryptosystem based on cryptographic methods may be used to protect the content owner's rights. Content may be encrypted to provide some measure of protection, but the software accessing the encrypted content is still vulnerable to attack.

Various concepts from the field of cryptography, such as public key cryptography, digital signatures, and certificates, are discussed herein to assist the reader in understanding the present invention.

In modern cryptography, the security of the cryptographic algorithm (or cipher) is not dependent on keeping the algorithm secret, but instead on using a key that is kept secret. Public key cryptography uses two keys to perform cryptographic operations. One key is public and known to everyone while the second key is private and known only to a particular user. Depending on the cipher, there are two uses of public key cryptography. The first use is encryption where the public key can be used to send information that only a user with the corresponding private key can read. The second use is digital signatures where the public key is used to verify the digital signature while the private key is used to create the signature.

A digital signature convinces a recipient that the signer and no one else deliberately signed a document (e.g., a computer file), prevents the signer from claiming that he/she did not sign a document (non-repudiation), and prevents the document from being altered without detection. In public key algorithms such as Digital Signature Algorithm (DSA), a separate cipher is used for digital signatures that cannot be used to encipher but simply for verification. DSA was proposed by the National Institute of Standards and Technology (NIST) in August, 1991, for use in the Digital Signature Standard (DSS).

A practical consideration in using public key algorithms is that they are not efficient enough to sign large documents. Consequently, digital signature protocols use one-way hash functions to improve performance and security of the protocol. A one-way hash function, H(M), maps an arbitrary length message M to a fixed-length value h. It also has the following characteristics to make it secure: 1) given M, it is easy to compute h; 2) given h, it is hard to compute M such that H(M)=h; and 3) given M, it is hard to find M' such that H(M)=H(M'). If an attacker could do either 2) or 3), then he could undermine the digital signature protocol that uses one-way functions by either altering documents or reusing signatures.

Certificates are used to provide a tight binding between a public/private key pair and an identity. The binding must be certified by some certificate authority using a digital signature. Certificates may imply privileges like a credit card or a driver's license. For certificates to be useful, there must be at least one known trusted public key. This key is called the root key and the corresponding certificate is called the root certificate. The root key must be distributed by some trusted means like certified postal mail.

With the arrival of new classes of computer applications, such as content management, whose basic integrity must be assumed or verified, new security techniques must be developed. Generally, users need methods of authenticating the origin of software and testing the integrity of the software, all within a cryptosystem environment.

Consider the situation where an application program running on a user's PC accesses encrypted digital content on a storage medium. For example, the application could be a digital versatile disk (DVD) player and the storage medium could be a DVD. The user typically buys the DVD player software, installs it on the PC, and buys DVD content to be operated on by the DVD player. The content may include any multimedia data. The content on the DVD is encrypted by the DVD manufacturer to prevent unauthorized copies from being made by users. The user cannot simply view the DVD's content; it must be decrypted by the DVD player and the DVD player typically does not provide the capability for storing decrypted content. The key used to decrypt the DVD is typically included in the DVD player so that when the user inserts a DVD into a DVD drive, the DVD player decrypts the encrypted content and plays it in real-time for the user.

This scenario appears to provide adequate security, however, the system is open to attack. The key is able to be used with all encrypted DVDs. The DVD player software could be "hacked" and the key obtained. A rogue DVD player could then be constructed to use the recovered key to decrypt any encrypted DVD content and store it on the PC's hard drive for subsequent unauthorized copies to be made.

In response, what is required is a method which will allow the fundamentally insecure, open PC to execute software which cannot be observed or modified in order to enable trusted access to encrypted digital content. Furthermore, any key needed for decryption must be dynamically provided to the trusted software and not "pre-loaded". The key should also be dynamically generated for a specific instance of trusted software and specific encrypted content based on user input. Overcoming the deficiencies of the prior/art and fulfilling these requirements would greatly increase the protection available for digital content access systems.

SUMMARY OF THE INVENTION

An embodiment of the present invention is a method of securely distributing data to a program on a remote system. The method includes the steps of generating an asymmetric key pair having a public key and a private key, encrypting predetermined data with the generated public key, building an executable tamper resistant key module identified for the program, the executable tamper resistant key module including the generated private key and the encrypted predetermined data, and sending the executable tamper resistant key module to the remote system. The tamper resistant key module is then executed on the remote system to check the integrity and authenticity of the program and the integrity of the tamper resistant key module itself. If the validation process is successful, then the encrypted predetermined data is decrypted with the generated private key included in the tamper resistant key module.

BRIEF DESCRIPTION OF THE DRAWINGS

The features and advantages of the present invention will become apparent from the following detailed description of the present invention in which:

FIG. 3 is a diagram illustrating an example of a manifest;

DETAILED DESCRIPTION OF THE PRESENT INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

An embodiment of the present invention includes a method of securely distributing a private key to a user's application program (also called a "trusted player" such as a digital versatile disk (DVD) player, compact disk read only memory (CD-ROM) player, or floppy disk device driver, and the like) with conditional access based on verification of the trusted player's integrity and authenticity. The trusted player can then use the private key to decrypt or sign a digital object. Conditional access to digital content is controlled because the trusted player is not pre-loaded with any key; each key is dynamically generated and communicated in real-time to the trusted player in a secure manner. Thus, the trusted player is not dependent on only one global key for decryption purposes of all digital content for the trusted player. Instead, each key is valid only for selected digital content (e.g., a particular movie, song, game, etc.). Additionally, the key is not nakedly transmitted to the trusted player, because the key could then be intercepted and copied. Instead, it is wrapped into a key module in which the key can only be used by the right trusted player as determined by the key module. The key module plugs in to the trusted player to validate the player and decrypt the content.

An embodiment of the present invention binds the integrity of a given application to its ability to perform some cryptographic operation using an asymmetric key pair in a manner that is tamper resistant. The goal is to prevent an unencrypted copy of digital content to be made. The trusted player will not be able to perform the cryptographic operation if its integrity has been compromised. An embodiment of the present invention includes integrity verification kernels (IVKs), the use of an asymmetric key pair and a key compiler, and tamper resistance methods. It combines the cryptographic technologies of digital signatures and certificates with tamper resistant software to improve the integrity of the trusted player and a key module on the PC. Once these methods are used, this software is very difficult to modify without detection. Additionally, intrusive debuggers may not be used to debug or trace software protected in this manner.

Figure 1:
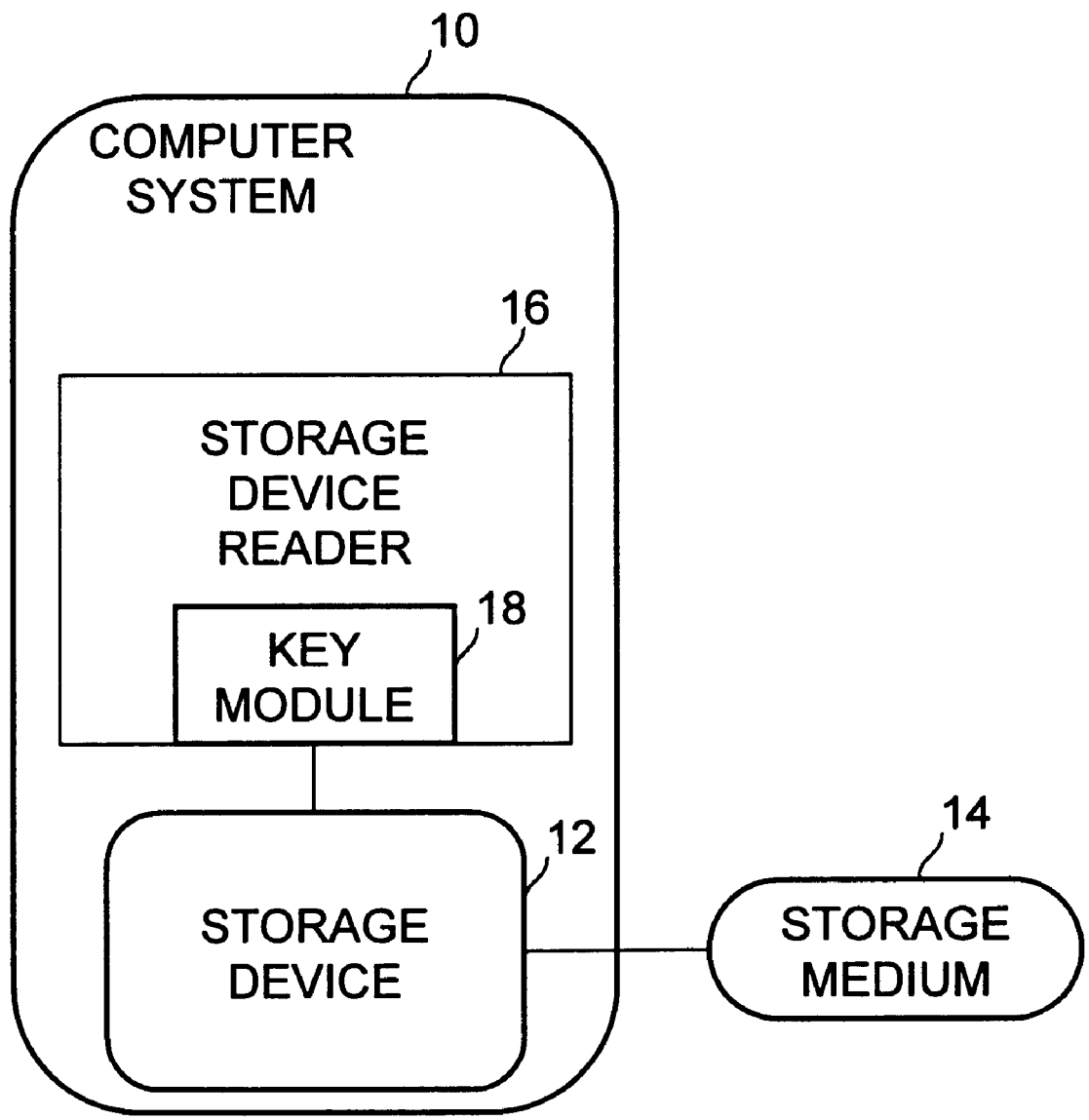
FIG. 1 is a diagram of the computer system environment of one embodiment of the present invention.

FIG. 1 is a diagram of the computer system environment of one embodiment of the present invention. A computer system 10 (such as a PC) includes a storage device 12 which accepts one or more removable storage mediums 14. The storage device may be a floppy disk drive unit, a CD-ROM drive unit, a DVD drive unit, or other data storage unit not yet developed. The removable storage medium may be a floppy disk, a CD-ROM, a DVD, or other data storage medium not yet developed. The storage medium includes digital content encrypted to provide protection against unauthorized use. The digital content may consist of any multimedia data, such as films, music, games, etc. The data on the storage medium is accessed by a program such as a storage device reader 16 via key module 18. The storage device reader forwards decrypted digital content to other application programs (not shown) for presentation or other use by a user (not shown). For example, the storage device reader may be a trusted DVD player and the digital content may be a feature film, the reader may be a CD-ROM player and the digital content may be a computer game, the reader may be a CD-ROM audio player and the digital content may be recorded music, etc. The storage device reader 16 interacts with a key module 18, which is downloaded from a communications network or otherwise accessed by the storage device reader. The key module 18 verifies that the storage device reader is authentic and that access to the digital content is allowed. The key module uses a key integral with the key module to decrypt the encrypted digital content. If the storage device reader is verified and it is indeed the authorized storage device reader software asking the key module for access to the digital content, then the digital content is decrypted by the key module. Otherwise, the digital content is not decrypted. Hence, the key module ensures that the party requesting the decryption of an encrypted digital content is authentic and its integrity is verified. Preferably, key module 18 is provided dynamically by a content provider from a remote system over a communications network such as the Internet.

There are various ways that a malicious user or program can attack the system of FIG. 1 to attempt to defeat the security measures. First, the malicious user may attempt to corrupt the key module to always return a positive verification of the storage device reader, despite the fact that either the key module, the storage device reader, or both, may have been altered, or attempt to change the integrity parameters in the key module. If the malicious user can locate and identify the key in the key module, the malicious user can try to expose the key. The malicious user may try to closely monitor the operation of the key module with a debugging tool to capture the key at the critical moment when it is used to decrypt the digital content. Finally, the malicious user may halt the computer system (i.e., "dump core") during the time when the key is being used to decrypt the digital content and search the memory contents of the computer system to identify the key. The present invention is designed to prevent or obstruct all of these attacks by the combined methods of tamper resistance, authentication, and verification of integrity.

Integrity is determined by using digital signatures. The integrity of executing storage device reader software is determined by generating a digital signature of the software. An integrity verification kernel (IVK) is software that verifies that a program image corresponds to the supplied digital signature. An IVK is a small code segment that has been "armored" using methods to ensure that it is not easily tampered with. An IVK can be used alone, to ensure that its tasks are executed correctly, or it can be used in conjunction with other software to provide the assurance that the other software has executed correctly (that is, they can be used as verification engines). This use of an IVK provides a robust mechanism for detecting changes made to executing software, where those changes might be caused by transmission errors or malicious attacks to the software. Any change to the software results in a failure in the verification process. IVKs, designed to make software tamper resistant, are constructed to perform self-checks of object code, bilateral authentication of partner modules, and checks on local and remote data to verify the integrity of a software module. The IVK is self-modifying and self-decrypting. Two software modules requiring to communicate with each other can establish that the module they are calling is indeed the one they are expecting by computing the digital signature of the called module and comparing the computed signature against a predetermined value. This process is called bilateral authentication. IVKs enable these mechanisms within selected software modules such as the storage device reader and the security module.

A key compiler is a program that takes an asymmetric key pair, which is represented as data, and turns it into a piece of executing code such as the key module 18. In this way, the entire key is never assembled at one place in a program at one point in time. Instead, pieces of the key are revealed as they are needed. Thus, the key is distributed in program space. This makes it hard for an attacker to find and change the key.

Tamper resistant software is software which is resistant to observation and modification. It can be trusted, within certain bounds, to operate as intended even in the presence of a malicious attack. The software is generated by using a tamper resistant compiler. The tamper resistant compiler is a compiler that when applied to a well prepared software module replaces the plain-text source code compiler generated image with a new image that is obfuscated. This self-decrypting software will only execute properly if no part of the image has been altered from the time it was compiled by the tamper resistant compiler. The tamper resistant compiler is a software approach towards providing kernels of software with the ability to run in a "hidden" execution mode. Attempts to decipher what the software is actually doing, or modifications made to the software, will result in the complete failure of the kernels (i.e., it will not decrypt properly). In an embodiment of the present invention, the tamper resistant compiler is applied to the IVKs and to the output of the key compiler. In the context of FIG. 1, all or significant portions of key module 18 are processed by the tamper resistant compiler (not shown) to protect it from tampering and the key module includes an IVK to validate the storage device driver. Detailed methods for creating the tamper resistant module and providing integrity verification processing with IVKs and bilateral authentication are disclosed in pending US patent applications entitled "Tamper Resistant Methods and Apparatus", Ser. No. 08/662,679, filed Jun. 13, 1996, now U.S. Pat. No. 5,892,899 and "Tamper Resistant Methods and Apparatus", Ser. No. 08/924,740, filed Sep. 5, 1997, both of which are commonly assigned to the same entity as the present invention and are incorporated herein by reference.

Figure 2:
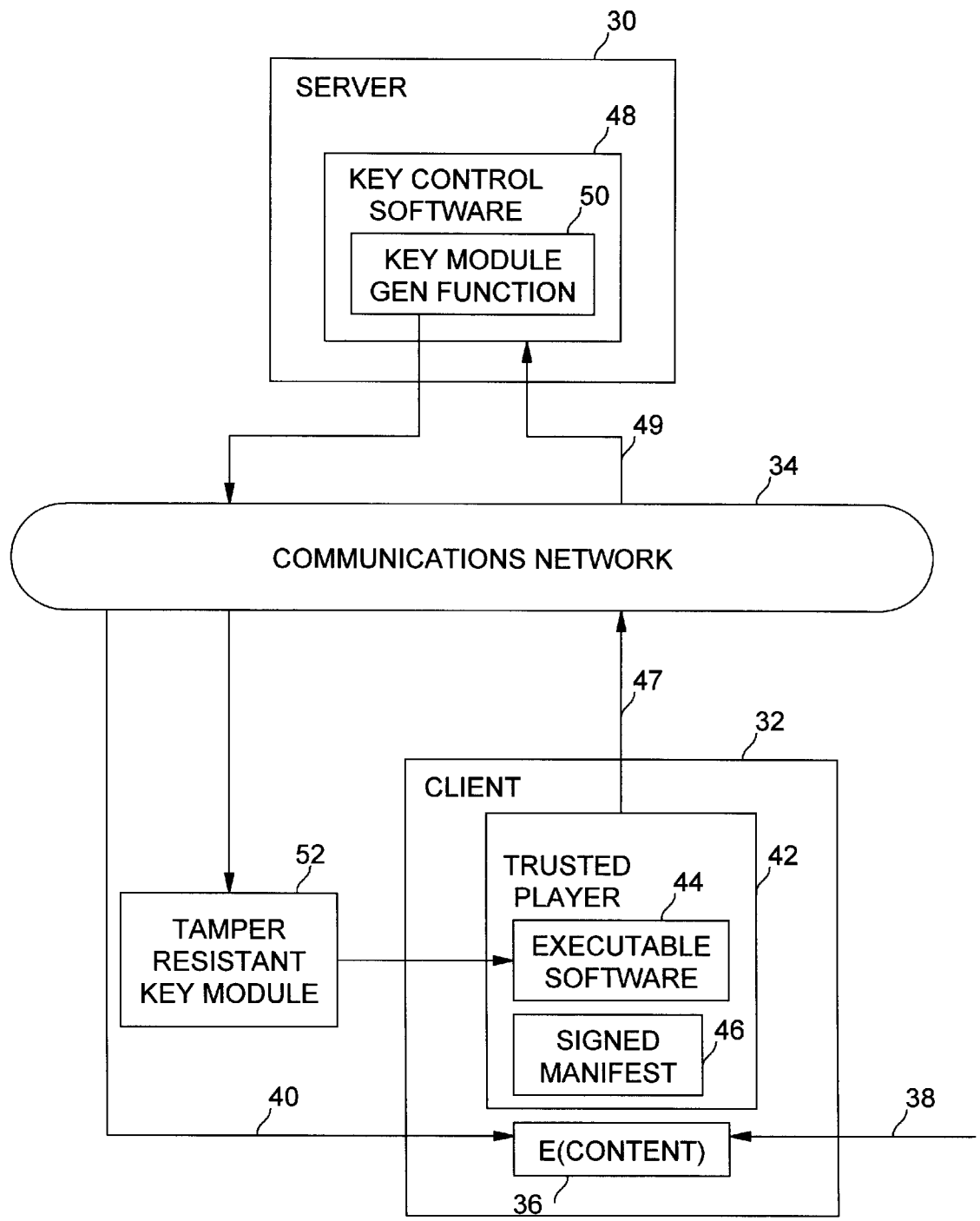
FIG. 2 is a diagram of a trusted player having the capability to use a key mechanism without direct access to the key according to the present invention.

FIG. 2 is a diagram of a trusted player having the capability to use a key mechanism without direct access to the key according to the present invention. In the configuration shown in FIG. 2, a server computer system 30 communicates with a client computer system 32 via a communications network 34. In this embodiment, server 30 is a computer system providing files and data to other computer systems, client 32 is a PC being operated by a user (not shown), and communications network 34 is the Internet, although other combinations of computer systems and networks may also be used as is appreciated by one skilled in the art. The user interacts with client 32 to request it to read and display some encrypted digital content E(Content) 36. The encrypted content may be a single physical copy of a DVD, CD-ROM, audio CD, or other storage medium inserted into an I/O subsystem (not shown) of client 32 via line 38, or it may be a file downloaded over communications network 34 via line 40 prior to usage. The encrypted content is not accessible without a key to decrypt it.

Trusted player 42 is included in client 32 to read the encrypted digital content E(Content), decrypt it, and play it for the user. In this embodiment, trusted player 42 is a DVD player, however, in other embodiments, trusted player 42 may consist of other content readers and players such as CD-ROM drive readers, floppy disk drive readers, streaming audio and video readers, text readers, etc. Trusted player 42 includes executable software 44, which is the code image of the trusted player as loaded into the memory of client 32. Also included in the trusted player is a signed manifest 46.

The manifest is a statement of the integrity and authenticity (i.e., a signature) of the trusted player software. The manifest is generated by the manufacturer of the trusted player or other provider of the trusted player software. Generally, the manifest is a credential about the trusted player including a digital signature of the trusted player software. Signed manifests describe the integrity of a list of digital objects of any type and associate arbitrary attributes with those objects in a manner that is tightly binding and offers non-repudiation. The integrity description does not change the object being described as it exists outside of the object. This means that an object can exist in encrypted form and processes can inquire about the integrity and authenticity of an object or its attributes without decrypting the object. A section of the manifest contains a reference to the object, attributes of the object, and a list of digest algorithm identifiers used to digest the object and the associated digest values. The signer's information describes a list of references to one or more sections of the manifest. Each reference includes a signature information section which contains a reference to a manifest section, a list of digest algorithm identifiers used to digest the manifest section and the associated digest value, and any other attributes that the signer may wish to be associated with the manifest section. The signature block contains a signature over the signer's information. FIG. 3 is a diagram illustrating an example of a manifest. In this example, the manifest includes referents such as version number, cryptographic algorithm, signature version, and a digital signature.

The trusted player and its signature are freely distributable. However, there is no secret (such as a decryption key) embedded in the trusted player. In contrast, the manifest 46 is unique for each trusted player 42. It contains a unique identifier relating to the trusted player. For example, the unique identifier could be a number randomly generated by the manufacturer or other provider, a serial number, a credit card number, etc.

Referring back to FIG. 2, when a user desires to view the encrypted content E(Content) 36, trusted player 42 requests the keys required to perform the decryption operation from key control software 48 running on server 30 via lines 47 and 49. As part of the request, trusted player includes the identifier of the encrypted content, the manifest 46, and optionally, a client identifier. Additionally, the request may include some financial information such as a credit card number or billing identifier so server 30 can charge the user for access to the digital content. In this way the encrypted content is freely distributable but the user cannot make use of the content until a fee has been paid to obtain the necessary key to decrypt the content. When the server has; the manifest, the server calls key control software 48 to execute key module generation (gen) function 50. This function creates a tamper resistant key module 52 containing the keys necessary to decrypt the selected encrypted content 36 and code to validate the trusted player. The key module also includes an integrity verification kernel (IVK) that, when executed by client 32, will attempt to validate the trusted player. The IVK checks that the trusted player accessing the key module on the client is the correct trusted player according to the manifest and that it has not been altered since purchase and installation by the user.

The key module is forwarded over communications network 34 to client 32. It is a "plug-in" to executable 44 of trusted player 42. The key module is generated to work with a specific trusted player as identified by the user's request and manifest, and also is unique for specific, user-selected digital content.

The key module contains a plurality of keys. It contains an asymmetric public key for verifying the digital signature of the manifest. The digital signature was created using an asymmetric private key by the manufacturer of the trusted player. To create a key module capable of verifying the manifest, key module generation function 50 needs to obtain the corresponding asymmetric public key. The key module also contains one or more symmetric keys for decrypting the encrypted digital content. Finally, the key module includes an asymmetric private key for decrypting the encrypted symmetric public keys when the validity of the trusted player on the client is assured.

Figure 4A:
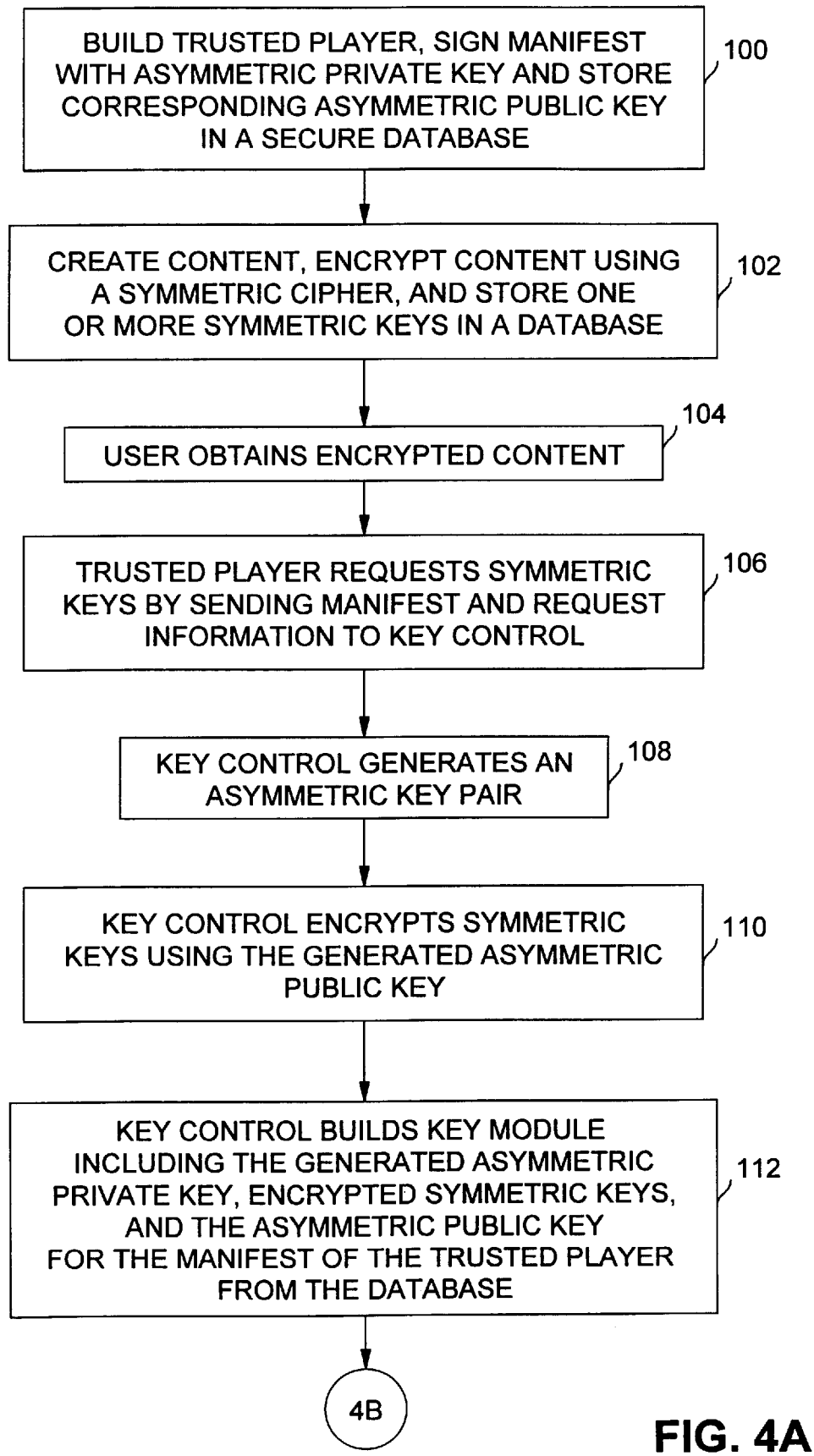
FIGS. 4A and 4B are flow diagrams illustrating the operation of a secure key distribution system according to the present invention.
Figure 4B:
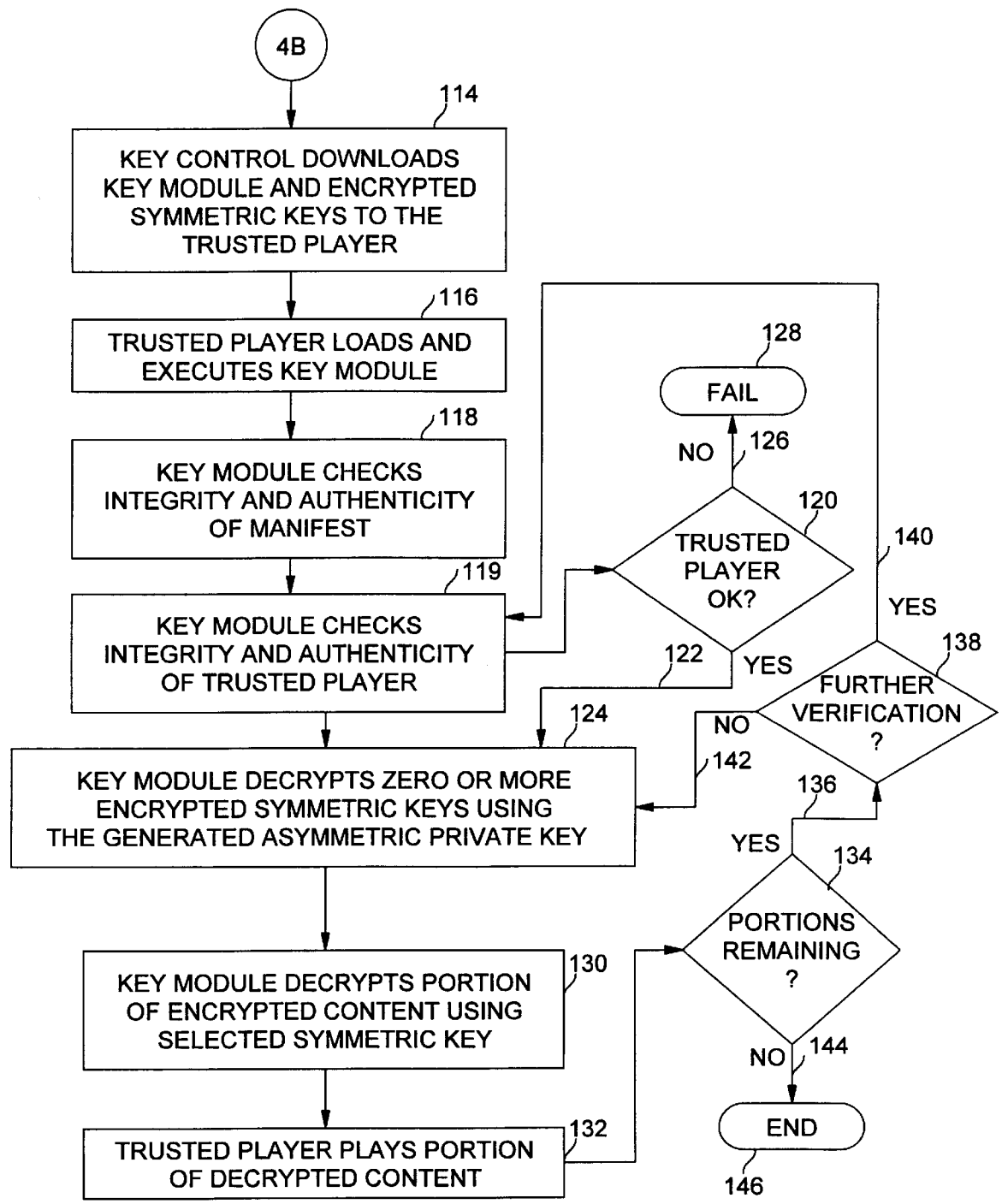

FIGS. 4A and 4B are flow diagrams illustrating the operation of a secure key distribution system according to the present invention. Initially, at step 100, an entity such as a trusted player manufacturer builds a trusted player and an accompanying manifest, and digitally signs the manifest with an asymmetric private key. The corresponding asymmetric public key is stored in a secure database accessible to the server. The trusted player is purchased by a user and installed on the disk drive of the user's PC (the client 32 in FIG. 2). The manifest is also loaded onto the client system. At step 102, a content provider creates digital content, encrypts the content using one or more symmetric keys, and stores the corresponding symmetric keys in the same or another secure database. The secure databases may be accessible by server 30, e.g., over the Internet. The user then obtains the encrypted content at step 104, for example, by purchasing it at a retail store, by mail order, or through an on-line purchase and delivery mechanism.

When the user desires to play the encrypted content, he or she directs the trusted player on the client system to initiate the performance operation through a well-known graphical user interface. At step 106, the trusted player requests the symmetric keys for decrypting the encrypted content from the server by sending a copy of the trusted player's manifest and the user's information regarding the title of the content, and optionally, financial information for the transaction, to the key control software within the server. Key control then generates the key module by execution of the following steps. First, key control generates an asymmetric key pair at step 108. Next, at step 110, key control obtains the symmetric keys associated with the user-selected content from the database and encrypts the symmetric keys using the generated asymmetric public key. Finally, at step 112, key control builds a tamper resistant key module with the generated asymmetric private key, the now-encrypted symmetric keys, and the asymmetric public key for the manifest of the trusted player from the database. The tamper resistant key module includes an IVK and is made tamper resistant by processing it by a tamper resistant compiler. Processing then continues on FIG. 4B via connector 4B.

At step 114 on FIG. 4B, key control downloads the tamper resistant key module including the encrypted symmetric keys to the trusted player. At step 116, the trusted player loads the tamper resistant key module and executes it. The executing key module checks the integrity and the authenticity of the manifest at step 118. Next, at step 119, the key module checks the integrity and authenticity of the trusted player. The IVK in the key module verifies that the signature of the trusted player corresponds to the manifest. To accomplish this, when the IVK in the key module is being executed by the client, it calculates the digest of the trusted player and compares the calculation to the digest in the manifest. If the IVK in the key module validates the manifest and the trusted player, then the key module is allowed to decrypt the encrypted digital content. The validation processing is performed according to bilateral authentication of the trusted player and the IVK in the key module as is described in pending US patent applications entitled "Tamper Resistant Methods and Apparatus", Ser. No. 08/662,679, filed Jun. 13, 1996, now U.S. Pat. No. 5,892,899, and "Tamper Resistant Methods and Apparatus", Ser. No. 08/924,740, filed Sep. 5, 1997 both of which are commonly assigned to the same entity as the present invention and are incorporated herein by reference. If the key module determines that the integrity and authenticity of the trusted player is acceptable at step 120, then Yes path 122 is taken to step 124 for further processing. Otherwise, No path 126 is taken to failure condition 128. No further processing for accessing the selected encrypted content is performed.

If the trusted player is validated, the tamper resistant key module decrypts zero or more encrypted symmetric keys using the generated asymmetric private key at step 124. When at least one of the symmetric keys is decrypted, the key module uses a selected one of the symmetric keys to decrypt a small portion of the encrypted content at step 130. The trusted player then plays this portion of the newly decrypted content for the user at step 132. If there are remaining portions of the content to be played at step 134, then Yes path 136 is taken to step 138. If further verification of the trusted player is desired, Yes path 140 is taken back to step 119, where further verification of the trusted player is performed to ensure that the trusted player is not being tampered with during playback of the content. Hence, after the first verification, the key module can be left in a state that provides incremental verification and decryption processing. This allows the trusted player to only store a few decrypted symmetric keys at any time. If no further verification is desired, No path 142 is taken to step 124 for additional decryption of encrypted symmetric keys. At step 130, the same or a newly selected and possibly newly decrypted symmetric key may be used to decrypt the current portion of the content. When no portions of the content remain to be played, No path 144 is taken from step 134 to End step 146.

Figure 5:
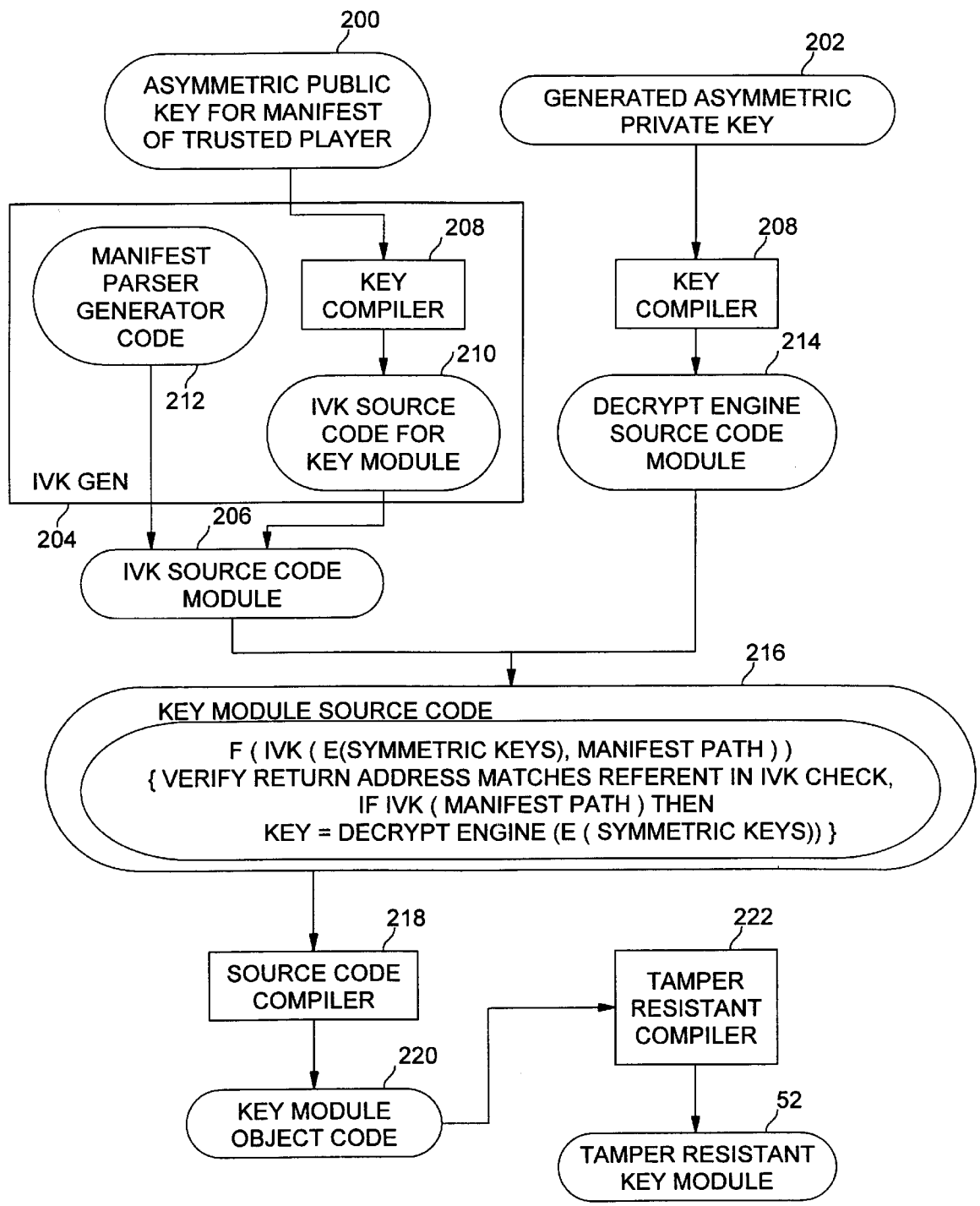
FIG. 5 is a diagram of the key module generation function.

FIG. 5 is a diagram of the key module generation function of step 112 of FIG. 4A. The key module generation function takes as input the asymmetric public key for the manifest of the trusted player 200 and the generated asymmetric private key 202. It also references the symmetric keys (not shown) used to decrypt the selected encrypted digital content. The key module generation function produces the tamper resistant key module 52 to be downloaded to the client 32. The asymmetric public key for the manifest of the trusted player 200 is passed to an Integrity Verification Kernel (IVK) generation (GEN) function 204. The IVK Gen function 204 creates an IVK source code module 206 that uses the asymmetric public key 200 as the root of trust. The IVK checks the manifest and the trusted player using the embedded asymmetric public key.

A key compiler 208 computes the Montgomery components of the asymmetric public key 200 for the manifest and generates IVK source code for key module 210 for calculating digital signatures using those components. In one embodiment of the present invention, the source code is generated in the "C" programming language, although other programming languages may also be used. The source code which is output contains the "unrolled", optimized code for computing a cryptographic hash function followed by modular exponentiation. The asymmetric public key 200 is hard-coded into the source code 210 as part of the mathematical operations performed by the key compiler. The manifest parser generator source code 212 is static source code that includes the IVK's entry code, generator code, accumulator code, and other code for tamper detection. Supported services in this code include locating credentials and code using a registry, verification of object code prior to loading on disk and after loading in memory on the client, and validation of addresses in previously verified modules to provide secure linkage. The generated "C" IVK source code for the key module 210 and the manifest parser generator source code 212 are combined into the single IVK source code module 206.

In parallel with IVK generation function processing, the generated asymmetric private key 202 for use in decrypting the encrypted symmetric keys is processed by another instance of key compiler 208. The key compiler computes the components of the asymmetric private key 202 for the encrypted symmetric keys and generates decrypt engine source code module 214. When executed, the decrypt engine source code module decrypts the encrypted symmetric keys. The decrypt engine source code module is merged with the IVK source code module to produce key module source code 216.

Key module source code 216 is structured as a function. Given an IVK having the encrypted symmetric keys and a path on the client to the manifest, the function verifies that the return address in the trusted player (i.e., the code that is calling the tamper resistant key module) matches the appropriate referent in the IVK check. Then, if the manifest path is correct, the decrypt engine module executes to decrypt the symmetric keys with the generated asymmetric private key embedded in the function. The key module source code is compiled by a standard source code compiler 218 to produce relocatable key module object code 220. The key module object code is then passed to tamper resistant compiler 222. In an embodiment of the present invention, the tamper resistant compiler operates on position-independent Intel Architecture code. It takes as input a procedure and those procedures that it directly calls, and produces a self-modifying version of the same code that decrypts only the currently executing step and the last or next step at any given moment.

The tamper resistant key module is now merely a vector of encrypted bytes. The vector of encrypted bytes has a defined entry point which is not encrypted. The encrypted bytes are eventually loaded into the client where the trusted player can call the function described above to verify the trusted player and provide the decrypted symmetric keys.

In an alternate embodiment, the manifest parser generator source code 212, IVK source code for key module 210, and decrypt engine source code module 214 can be compiled individually and the object code for each component can be linked together by an object code linker to form key module object code 220.

The processing shown in FIG. 5 for building a decrypt engine function can also be used to build a signature verification engine function. In this case, rather than including the encrypted symmetric keys in the key module source code function, the digest of the object to sign is included. The signature verification engine function is performed on the digest of the specified object using the generated asymmetric private key to generate a signature, which can be validated by the trusted player or other application on the client.

It is important to note that although an embodiment focused on a trusted player and the secure delivery of encrypted symmetric keys has been described herein, the methods of the present invention could be used for delivery of any data in a secure manner to a requesting program on a system served by a server.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of securely distributing data comprising:
   generating an asymmetric key pair having a public key and a private key;
   encrypting predetermined data with the generated public key; and
   building an executable tamper resistant key module identified for a selected program, the executable tamper resistant key module including the generated private key and the encrypted predetermined data.

2. The method of claim 1, wherein the program is on a remote system and further comprising sending the executable tamper resistant key module to the remote system.

3. The method of claim 2, further comprising executing the executable tamper resistant key module on the remote system to check the integrity and authenticity of the process and the integrity of the tamper resistant key module.

4. The method of claim 3, further comprising decrypting the encrypted predetermined data with the generated private key for the tamper resistant key module when the program is authentic and the program's integrity is validated and the tamper resistant key module's integrity is validated.

5. The method of claim 4, further comprising decrypting encrypted digital content resident on the remote system using the decrypted predetermined data.

6. The method of claim 5, wherein the program comprises a trusted player and the trusted player plays the decrypted digital content for a user of the remote system.

7. The method of claim 2, wherein the predetermined data comprises at least one key used to decrypt selected encrypted digital content on the remote system.

8. The method of claim 7, wherein the at least one key is specifically associated with the selected encrypted digital content but not other encrypted digital content.

9. The method of claim 1, wherein building the executable tamper resistant code module comprises generating an integrity verification kernel.

10. The method of claim 9, wherein generating an integrity verification kernel comprises accessing an asymmetric public key of a predetermined asymmetric key pair associated with a manifest of the program signed by an asymmetric private key of the predetermined asymmetric key pair, producing integrity verification kernel code with the asymmetric public key for verifying the signed manifest of the program and combining manifest parser generator code and the integrity verification kernel code to produce the integrity verification kernel.

11. The method of claim 10, wherein the program comprises a trusted player and the method further comprises building a manifest for the trusted player, signing the manifest with the asymmetric private key of the predetermined asymmetric key pair, and storing the asymmetric public key of the predetermined asymmetric key pair.

12. The method of claim 10, wherein building the executable tamper resistant key module further comprises building a decrypt engine with the generated private key for decrypting the encrypted predetermined data.

13. The method of claim 12, wherein building the executable tamper resistant key module further comprises combining the integrity verification kernel and the decrypt engine to produce a key module.

14. The method of claim 13, wherein building the executable tamper resistant key module further comprises compiling the key module with a tamper resistant compiler to generate the tamper resistant key module.

15. The method of claim 1, wherein the predetermined data comprises a plurality of symmetric keys used to decrypt selected encrypted digital content.

16. The method of claim 15, further comprising creating digital content, encrypting the digital content with the plurality of symmetric keys, and storing the plurality of symmetric keys for subsequent access during the decrypting step.

17. The method of claim 16, further comprising obtaining the encrypted digital content and requesting, by the remote system, the plurality of symmetric keys from a server performing the generating, encrypting, building and sending steps.

18. The method of claim 17, wherein the requesting step comprises providing an identifier of the selected encrypted digital content, an identifier of the remote system, and payment information for usage of the selected encrypted digital content.

19. A method of distributing a conditional use private key to a program on a remote system comprising:

generating an asymmetric key pair having a public key and a private key;

encrypting predetermined data with the generated public key;

building an executable tamper resistant key module identified for the program, the executable tamper resistant key module including the generated private key and the encrypted predetermined data;

sending the executable tamper resistant key module to the remote system;

executing the executable tamper resistant key module on the remote system to check the integrity and authenticity of the program, and the integrity of the tamper resistant key module; and decrypting the encrypted predetermined data with the generated private key when the program is authentic and the program's integrity is validated and the tamper resistant key module's integrity is validated.

20. A method of distributing a conditional use private key from a server system to a trusted player on a client system for providing authorized access to selected encrypted digital content comprising:

receiving a request from the trusted player for access to selected encrypted digital content on the client system;

generating an asymmetric key pair having a public key and a private key;

encrypting predetermined data with the generated public key;

building an executable tamper resistant key module identified for the trusted player, the executable tamper resistant key module including the generated private key and the encrypted predetermined data;

sending the executable tamper resistant key module to the client system;

executing the executable tamper resistant key module on the client system as part of the trusted player to check the integrity and authenticity of the trusted player, and the integrity of the tamper resistant key module; and decrypting the encrypted predetermined data with the generated private key when the trusted player is authentic and the trusted player's integrity is validated and the tamper resistant key module's integrity is validated.

21. The method of claim 20, wherein the predetermined data comprises at least one key used to decrypt the selected encrypted digital content on the client system.

22. The method of claim 21, wherein the at least one key is specifically associated with the selected encrypted digital content but not other encrypted digital content.

23. The method of claim 20, wherein the predetermined data comprises a plurality of symmetric keys used to decrypt the selected encrypted digital content.

24. The method of claim 23, further comprising creating digital content, encrypting the digital content with the plurality of symmetric keys, and storing the plurality of symmetric keys for subsequent access during the decrypting step.

25. The method of claim 20, further comprising decrypting encrypted digital content resident on the client system using the decrypted predetermined data.

26. The method of claim 25, wherein the trusted player plays the decrypted digital content for a user of the client system.

27. A machine readable medium having stored therein a plurality of machine readable instructions for execution by a processing unit, the machine readable instructions for generating an asymmetric key pair having a public key and a private key; for encrypting predetermined data with the generated public key; for building an executable tamper resistant key module identified for a selected program on a remote system, the executable tamper resistant key module including the generated private key and the encrypted predetermined data; and for sending the executable tamper resistant key module to the remote system to verify the authenticity and integrity of the program operating on the remote system and decrypt the encrypted predetermined data when the program is validated.

28. A machine readable medium having stored therein a plurality of machine readable instructions for execution by a plurality of processing units, the machine readable instructions for generating an asymmetric key pair having a public key and a private key; for encrypting predetermined data with the generated public key; for building an executable tamper resistant key module identified for a program on a remote system, the executable tamper resistant key module including the generated private key and the encrypted predetermined data; for sending the executable tamper resistant key module to a remote system, for executing the executable tamper resistant key module by a processing unit on the remote system to check the integrity and authenticity of the program, and the integrity of the tamper resistant key module; and for decrypting the encrypted predetermined data with the generated private key when the program is authentic, the program's integrity is validated and the tamper resistant key module is validated.

29. An apparatus for secure distribution of data comprising:

a processor for executing programming instructions; and a storage medium having stored thereon a plurality of programming instructions for execution by the processor, the programming instructions generating an asymmetric key pair having a public key and a private key, encrypting predetermined data with the generated public key, and building an executable tamper resistant key module identified for a program, the executable tamper resistant key module including the generated private key and the encrypted predetermined data.

30. The apparatus of claim 29, wherein the storage medium comprises instructions for sending the executable tamper resistant key module to the remote system.

31. A system for secure distribution of data comprising:

a first system comprising a first processor for executing a first set of programming instructions, and a first storage medium having stored thereon the first set of programming instructions for execution by the first processor, the first set of programming instructions generating an asymmetric key pair having a public key and a private key, encrypting predetermined data with the generated public key, and building an executable tamper resistant key module, the executable tamper resistant key module including the generated private key and the encrypted predetermined data; and a second system comprising a second processor for executing a second set of programming instructions, and a second storage medium having stored thereon the second set of programming instructions for execution by the second processor, the second set of programming instructions for operating as a trusted player of digital content, for receiving the executable tamper resistant key module from the first system, for executing the executable tamper resistant key module to check the integrity and authenticity of the trusted player, and the integrity of the tamper resistant key module; and for decrypting the encrypted predetermined data with the generated private key when the trusted player is authentic and the trusted player's integrity is validated and the tamper resistant key module is validated.

32. The system of claim 31, where the second set of programming instructions further comprise instructions for decrypting encrypted digital content resident on the second storage medium using the decrypted predetermined data.

33. The system of claim 32, wherein the trusted player plays the decrypted digital content for a user of the second system.

34. A method of securely distributing data encrypted by a public key of an asymmetric key pair comprising:

building an executable tamper resistant key module identified for a selected program resident on a remote system, the executable tamper resistant key module including a private key of the asymmetric key pair and the encrypted data; and sending the executable tamper resistant key module to the remote system.

35. A method of receiving and accessing data encrypted by a public key of an asymmetric key pair comprising:

receiving an executable tamper resistant key module identified for a selected program, the executable tamper resistant key module including a private key of the asymmetric key pair and the encrypted data;

executing the executable tamper resistant key module to check the integrity and authenticity of the selected program and the integrity of the tamper resistant key module; and decrypting the encrypted data with the private key when the selected program is authentic, the program's integrity is validated, and the tamper resistant key module's integrity is validated.

36. An article comprising a machine readable medium having stored therein a plurality of machine readable instructions for execution by a processing unit, the machine readable instructions for building an executable tamper resistant key module identified for a selected program resident on a remote system, the executable tamper resistant key module including a private key of an asymmetric key pair and data encrypted by a public key of the asymmetric key pair, and for sending the executable tamper resistant key module to the remote system.

37. An article comprising a machine readable medium having stored therein a plurality of machine readable instructions for execution by a processing unit, the machine readable instructions for receiving an executable tamper resistant key module identified for a selected program, the executable tamper resistant key module including a private key of an asymmetric key pair and data encrypted by a public key of the asymmetric key pair, for initiating execution of the executable tamper resistant key module to check the integrity and authenticity of the selected program and the integrity of the tamper resistant key module, and for decrypting the encrypted data with the private key when the selected program is authentic, the program's integrity is validated, and the tamper resistant key module's integrity is validated.

* * * * *